Feb. 7, 1939.  E. C. HORTON  2,146,215
WINDSHIELD CLEANER
Filed April 26, 1935
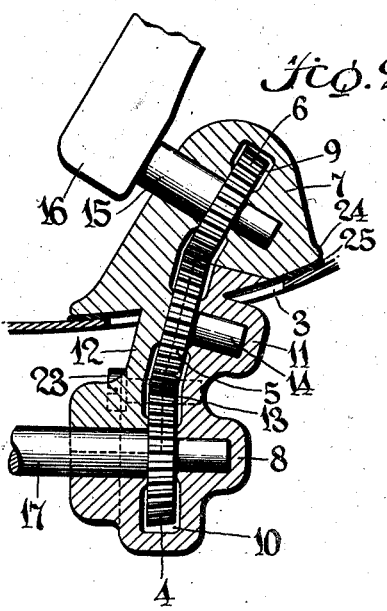
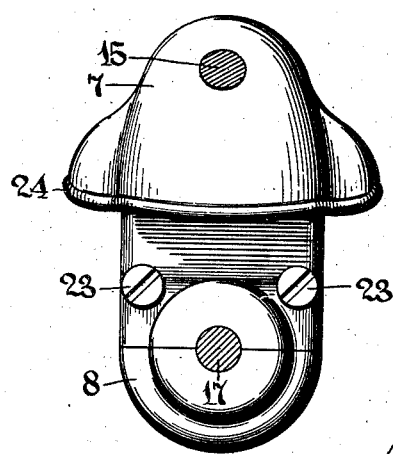
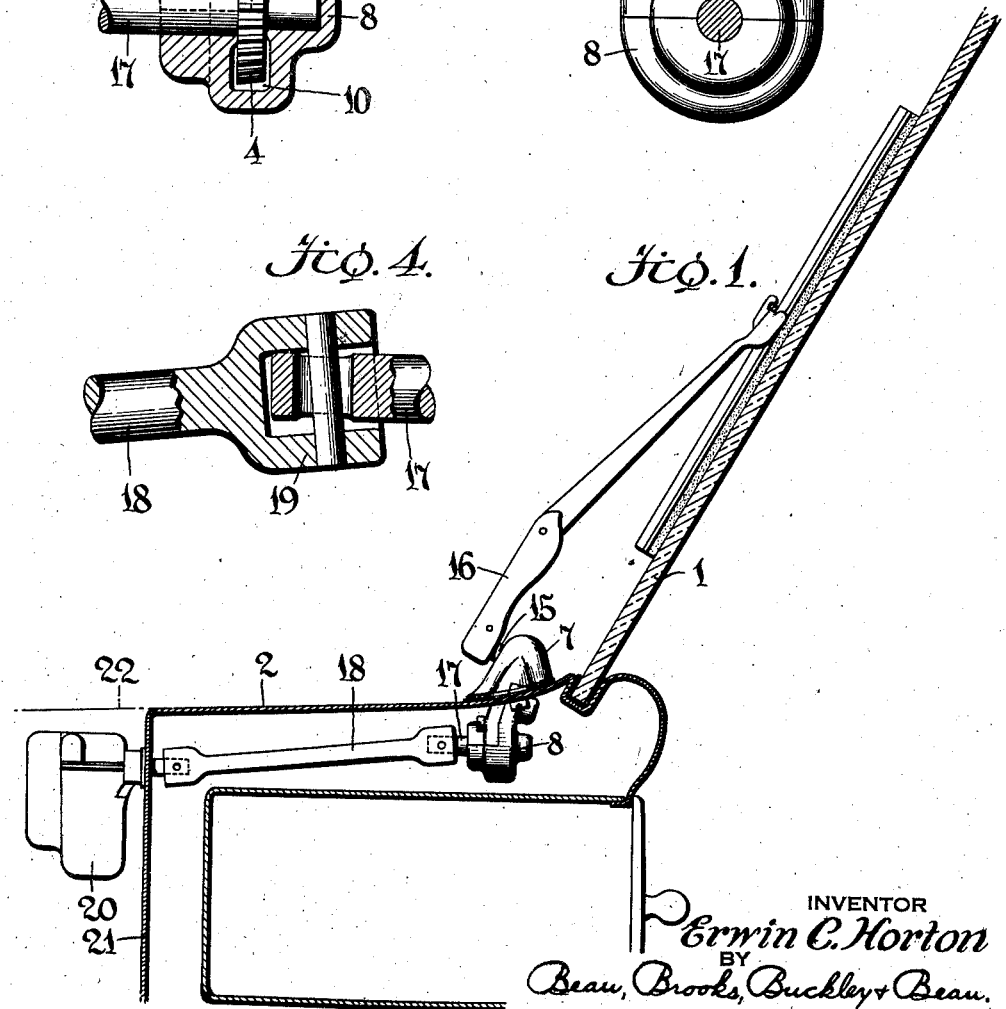
INVENTOR
Erwin C. Horton
BY
Beau, Brooks, Buckley & Beau.
ATTORNEYS Patented Feb. 7, 1939

2,146,215

UNITED STATES PATENT OFFICE 2,146,215

WINDSHIELD CLEANER

Erwin C. Horton, Hamburg, N. Y., assignor to Trico Products Corporation, Buffalo, N. Y., a corporation Application April 26, 1935, Serial No. 18,477

3 Claims. (Cl. 15—255)

This invention relates to a motor vehicle construction and has primary relation to the embodiment of the windshield cleaner mechanism in the body construction.

In the present day motor vehicles, the windshield cleaner is frequently mounted at the base or adjacent the base of the windshield and the latter is disposed in a slanting position so as to preserve the stream line design of the vehicle body. The wiper actuating shaft is customarily disposed substantially at a normal to the windshield so as to provide the required uniform pressure in the wiping contact of the wiper as it is oscillated back and forth across the glass. By reason of the slanting disposition of the windshield, and consequently the inclined mounting of the wiper actuating shaft, it has been difficult to provide a practical drive from a motor, or other source of power, beneath the cowl.

The present invention has for its object to provide a practical windshield cleaner installation for the motor vehicles which will be satisfactory and efficient in use and one which will readily adapt itself to the modern stream line designs of motor vehicles. Furthermore, the invention comprehends a durable construction which is easily and readily installed.

In the drawing, Fig. 1 is a fragmentary sectional view of a motor vehicle incorporating one embodiment of the improved windshield cleaner installation.

Fig. 2 is an enlarged sectional view through the power transmission unit.

Fig. 3 is a front elevation of such power transmission unit.

Fig. 4 is a detailed section through the flexible shafting.

Referring more particularly to the drawing, the numeral 1 designates the slanting windshield of a motor vehicle and 2 the cowl or apron structure thereof extending forwardly from the base of the windshield. Adjacent the base of the windshield, the cowl is provided with an opening 3 through which extends the cleaner drive and in which is disposed the power transmission unit of the windshield cleaner mechanism.

This transmission unit is herein illustrated as comprising a drive gear 4, a driven gear 6 and an intermediate connecting gear 5. These gears are housed and contained within a transmission housing which is depicted as being composed of two complemental castings 7 and 8, each provided with a gear pocket (9 and 10) and an extension which overlaps the extension of the companion casting or section, the two extensions 11 and 12 defining an itermediate pocket 13 for receiving the intermediate gear 5. The stub shaft 14 may be carried by one of the extensions and supported by the other to provide journal support for the gear 5. The gear 6 is fixed on the wiper actuating shaft 15, the latter being disposed substantially perpendicular to the plane of the windshield glass and extends from the housing section 7 for connection to the wiper carrying arm 16.

The drive gear 4 is fixed on the drive shaft 17 which is journaled in the housing section 8 and extends therefrom for connection, as through the flexible shafting 18 which includes one or more flexible joints 19, to the source of power. Herein this source is illustrated as consisting of a motor 20 which is conveniently disposed on the forward side of the dash 21 beneath the engine hood 22. This position of the motor serves to eliminate noise incidental to the operation thereof. Obviously the motor could be connected directly to the drive shaft 18 which is disposed in a substantially horizontal position beneath the cowl. Because of the slanting disposition of the windshield, the wiper actuating shaft 15 will be disposed at an angle to the drive shaft 17 but may be disposed in the same vertical plane therewith. For this reason, intermediate gear 5 and the driven gear 6 are shown displaced angularly therefrom and from each other, and likewise the gear pockets.

By sectionalizing the intermediate housing or pocket in the manner above set forth, the transmission may readily be assembled by simply dropping the gears 4 and 6 in their respective pockets and then pressing the shafts through their bearings, in their sides of the pockets, and into the respective gears with a firm fit. The two die cast sections are then assembled with the intermediate gear in place and the entirety made secure with bolts 23 which unite the sections of the housing together. This composite transmission housing provides intercommunicating gear chambers through which a contained lubricant may work in an efficient manner. The drive shaft 17 is preferably short to facilitate the introduction of the transmission housing downwardly through the cowl opening, subsequent to which the connection with the drive motor may be established. The upper housing section 7, is provided with a mounting flange 24 for seating on the marginal portions of the cowl about the opening 3, a weather proofing gasket or packing member 25 being interposed between such parts.

The present construction enables the mounting of the drive shaft 17 in a substantially horizontal position beneath the cowl but nevertheless permits the angular disposition of the wiper actuating shaft so as to mount it at a normal to the windshield glass.

What is claimed is:

1. In a motor vehicle having a windshield and a cowl body portion extending therefrom and provided with an opening, a windshield wiper operating mechanism comprising a shaft, a housing supported on the cowl over the opening therein and serving as a journal support for the shaft, power means arranged within the vehicle and spaced from the cowl opening for driving the shaft, said housing having a depending section removable from beneath the cowl portion and acting to support a second shaft having its axis extending substantially transverse of the depending section, flexible transmission means extending in a direction substantially lengthwise of and connecting a projecting end from the second shaft to the power means and flexing to permit removal of the housing section, and transmission means within the housing operatively connecting the two shafts.

2. In a motor vehicle having a windshield and a cowl body portion extending therefrom and provided with an opening, windshield wiper operating mechanism comprising a shaft, a housing supported on the cowl over the opening therein and serving as a journal support for the shaft, power means arranged within the vehicle for driving the shaft, said housing having a section removable from beneath the cowl portion and acting to support a second shaft, transmission means connecting the power means to the second shaft and permitting displacement of the housing from that section of the housing supporting the second shaft, and means within the housing operatively connecting the two shafts.

3. In a motor vehicle having a windshield and a cowl body portion extending therefrom and formed with an opening, windshield wiper operating mechanism comprising a shaft, a housing mounted on the cowl over the opening therein and supporting the shaft thereabove substantially normal to the windshield, said housing being removable from above the cowl and having a shaft supporting part extending through the opening and supporting a second shaft beneath the cowl portion in divergent relation to the first shaft, said shaft supporting part being displaceable beneath such cowl portion, means within the housing operatively connecting the two shafts and permitting such displacement of the shaft supporting part, and power means for operating the second shaft.

ERWIN C. HORTON.